(No Model.)

J. J. BURKE.
HITCHING CLASP.

No. 244,543. Patented July 19, 1881.

WITNESSES
Fred. G. Dieterich
August Peterson

By his Attorneys
Louis Bagger & Co.

INVENTOR
John J. Burke

UNITED STATES PATENT OFFICE.

JOHN J. BURKE, OF WALLA WALLA, WASHINGTON TERRITORY.

HITCHING-CLASP.

SPECIFICATION forming part of Letters Patent No. 244,543, dated July 19, 1881.

Application filed April 8, 1881. (No model.)

*To all whom it may concern:*

Be it known that I, JOHN J. BURKE, of Walla Walla, in the county of Walla Walla, Washington Territory, have invented certain new and useful Improvements in Hitching-Clasps; and I do hereby declare that the following is a full, clear, and exact description of the invention, which will enable others skilled in the art to which it appertains to make and use the same, reference being had to the accompanying drawings, which form a part of this specification, and in which—

Figure 1:
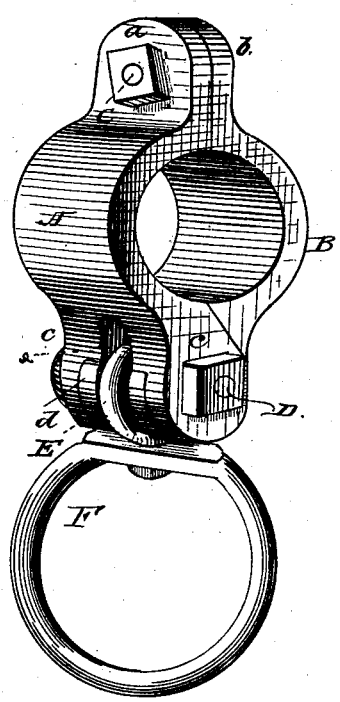
Figure 2:
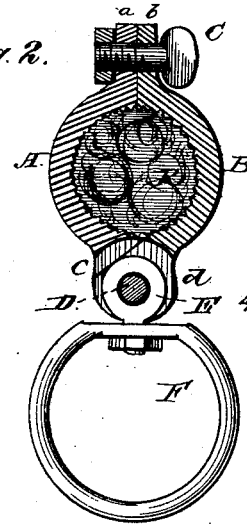
Figure 3:
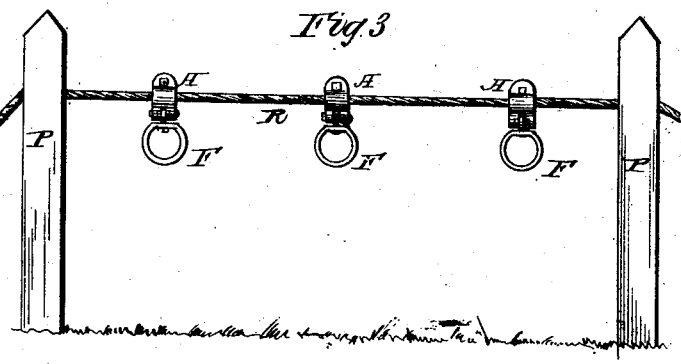

Figure 1 is a perspective view of my hitching-clasp or hitching attachment to picket-ropes. Fig. 2 is a longitudinal section of the same; and Fig. 3 is a view illustrating the application of the clasp.

Similar letters of reference indicate corresponding parts in all the figures.

My invention has relation to devices for hitching horses or other animals to the so-called "picket-ropes," which are used by the army of the United States at its several posts, garrisons, and permanent camps where cavalry, artillery, or mounted infantry are stationed. Heretofore it has been the custom to tie the halter-shank—a rope, chain, or leather strap from four to seven feet in length, which is attached to the under side of the halter—to the picket-rope; but by this method the tied knot is apt to slide on the rope, so that some of the animals will get too close together and others too far apart; besides, by running under the picket-rope from one side to the other, the halter shank or strap is apt to become entangled, causing loss of time by untying and having to rearrange it.

It is the object of my invention to overcome these obstacles by the construction of a simple attachment to the picket-rope in the nature of a clasp having a swivel-ring attached, in which the halter shank or strap is tied.

In the accompanying drawings, A and B represent the two jaws of the clasp, which, when placed together, form a broad ring large enough to be clasped tightly around the picket-rope R, which is suspended from four to six feet above the ground between posts P, placed from twenty to fifty feet apart. Each of the jaws or halves A B has a projecting lip, $a\ b$, which is perforated to receive a thumb-screw, C, or equivalent fastening device. At the opposite ends of the jaws A B are the knuckles $c\ d$, through which are inserted a bolt or pintle, D, forming the hinge or pintle of the clamp-jaws. The knuckles $c\ d$ are slotted at $e$ for the insertion of an eye, E, which passes around bolt D, and has a swivel-ring, F, at its lower end. If preferred, and to add to the efficiency of the device, the inner side of the jaws A B may be serrated or corrugated, as shown in Fig. 2 of the drawings, so as to bite the rope and prevent slipping or displacement of the clasp under all circumstances. The clasps are attached to the rope at suitable distances apart, as shown in Fig. 3, and the animals are hitched by their halter-shanks to the swivel-rings F, which prevent entanglement of the shanks or straps.

Having thus described my invention, I claim and desire to secure by Letters Patent of the United States—

The described hitching-clasp or hitching attachment to picket-ropes, composed of the jaws A B, having perforated lips $a\ b$ and knuckles $c\ d$, slotted at $e$, thumb-screw C, bolt D, eye E, and swivel-ring F, constructed and combined substantially as and for the purpose herein shown and specified.

In testimony that I claim the foregoing as my own I have hereto affixed my signature in presence of two witnesses.

JOHN JOSEPH BURKE.

Witnesses:
THOS. MCGREGOR,
R. P. PAGE WAINWRIGHT.